US012059735B2

(12) United States Patent
Hori et al.

(10) Patent No.: US 12,059,735 B2
(45) Date of Patent: Aug. 13, 2024

(54) CUTTING INSERT, INDEXABLE ROTARY CUTTING TOOL, AND BODY OF THE SAME

(71) Applicant: TUNGALOY CORPORATION, Fukushima (JP)

(72) Inventors: Issei Hori, Iwaki (JP); Ryuichi Saji, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 127 days.

(21) Appl. No.: 17/842,263

(22) Filed: Jun. 16, 2022

(65) Prior Publication Data
US 2023/0014557 A1 Jan. 19, 2023

(30) Foreign Application Priority Data
Jul. 15, 2021 (JP) .................................. 2021-117280

(51) Int. Cl.
B23C 5/10 (2006.01)
B23C 5/20 (2006.01)
B23C 5/02 (2006.01)

(52) U.S. Cl.
CPC .............. B23C 5/109 (2013.01); *B23C 5/02* (2013.01); *B23C 2200/203* (2013.01); *B23C 2200/293* (2022.02); *B23C 2210/084* (2013.01)

(58) Field of Classification Search
CPC ........ B23C 2200/203; B23C 2210/084; B23C 5/109; B23C 2200/284; B23C 200/289;
(Continued)

(56) References Cited

U.S. PATENT DOCUMENTS 4,840,518 A * 6/1989 Plutschuck ........... B23B 27/145
407/116
8,950,984 B2 * 2/2015 Choi ....................... B23C 5/202
407/42
(Continued)

FOREIGN PATENT DOCUMENTS

DE   11 2015 002 701 T5   3/2017
EP    1 782 902 A2        5/2007
(Continued)

*Primary Examiner* — Sara Addisu
(74) *Attorney, Agent, or Firm* — Studebaker & Brackett PC

(57) ABSTRACT

Provided is a structure for improving accuracy in attaching a cutting tool to a body and making it possible to increase the number of blades while the cutting tool is mounted on the body. A cutting insert 1 includes: an upper surface 10 that has a shape with a lengthwise direction LD and a widthwise direction SD; a lower surface that is located opposite to the upper surface 10; a peripheral side surface 30 that is formed so as to connect the upper surface 10 and the lower surface; cutting edges 51 and 52 that are respectively formed on an intersecting ridge line of the upper surface 10 and the peripheral side surface 30, and on an intersecting ridge line of the lower surface and the peripheral side surface 30, and each have a curved ridge line that extends in a lengthwise direction thereof; and a through hole 60 that penetrates from the upper surface 10 to the lower surface. End surfaces 31 and 32 located in the lengthwise direction LD of the upper surface 10 and the lower surface, of the peripheral side surface 30, are respectively inclined with respect to the upper surface 10 and the lower surface, and are parallel to each other. A reference surface 33 that is located opposite to the cutting edges 51 and 52, of the peripheral side surface 30, is a flat surface that is orthogonal to the upper surface 10 and the lower surface.

8 Claims, 16 Drawing Sheets

(58) Field of Classification Search
CPC ............... B23C 2200/283; B23C 5/22; B23C 2200/293; B23C 5/202; B23C 5/02; B23C 5/20
See application file for complete search history.

(56) References Cited

U.S. PATENT DOCUMENTS

| | | | |
|---|---|---|---|
| 9,597,740 B2 * | 3/2017 | Gamble | B23C 5/06 |
| 9,981,330 B2 * | 5/2018 | Sjoo | B23F 21/066 |
| 11,433,460 B1 * | 9/2022 | Asad | B23B 27/1614 |
| 11,491,560 B1 * | 11/2022 | Park | B23C 5/1009 |
| 2003/0215294 A1 * | 11/2003 | Wermeister | B23C 5/2462 |
| | | | 407/113 |
| 2006/0060053 A1 | 3/2006 | Tanaka et al. | |
| 2010/0124465 A1 | 5/2010 | Morrison et al. | |
| 2012/0070238 A1 * | 3/2012 | Men | B23C 5/1045 |
| | | | 407/120 |
| 2013/0136547 A1 * | 5/2013 | Kurokawa | B23C 5/109 |
| | | | 407/42 |
| 2014/0321927 A1 * | 10/2014 | Craig | B23C 5/2239 |
| | | | 407/120 |
| 2016/0082527 A1 * | 3/2016 | Komiyama | B23C 5/202 |
| | | | 407/115 |
| 2018/0036811 A1 * | 2/2018 | Saji | B23C 5/109 |
| 2020/0331077 A1 * | 10/2020 | Komatsu | B23C 5/202 |

FOREIGN PATENT DOCUMENTS

| | | | | | |
|---|---|---|---|---|---|
| JP | H09-234619 A | | 9/1997 | | |
| JP | H11-813 A | | 1/1999 | | |
| JP | 2006-326755 A | | 12/2006 | | |
| JP | 2012-509196 A | | 4/2012 | | |
| JP | 2017-189855 A | | 10/2017 | | |
| JP | 2017189855 A | * | 10/2017 | | |
| JP | 2017196692 A | * | 11/2017 | ............ | B23B 1/00 |
| JP | 2019048379 A | * | 3/2019 | ............ | B23C 5/08 |
| KR | 10-2009-0102423 A | | 9/2009 | | |
| WO | 2004/058438 A1 | | 7/2004 | | |
| WO | WO-2012114848 A1 | * | 8/2012 | ............ | B23C 5/109 |
| WO | WO-2013018724 A1 | * | 2/2013 | ............ | B23C 5/207 |
| WO | 2021/039913 A1 | | 3/2021 | | |

\* cited by examiner

—— CUTTING EDGE 51 ON UPPER SURFACE

········ CUTTING EDGE 52 ON LOWER SURFACE

CUTTING INSERT, INDEXABLE ROTARY CUTTING TOOL, AND BODY OF THE SAME

BACKGROUND

Field

The present invention relates to a cutting insert, an indexable rotary cutting tool, and the body of the same.

Description of Related Art

When five-axis machining is to be performed on a cutting-target material or the like such as a part, a die, or the like with a complicated shape, a cutting insert with a curved cutting edge and an indexable rotary cutting tool to/from which the cutting insert can be attached/detached may be used in order to realize high-efficiency machining and ensure a good machined surface in the finishing process. Such a cutting insert used in the finishing process or the like requires high accuracy regarding cutting edge contour and so on (for example, see Patent Publication JP2017-189855A).

SUMMARY

However, conventional cutting inserts such as that described above may have a positive shape in order to ensure sharpness, which may lead to poor accuracy in attaching such an insert to the body of a cutting tool. Also, if the number of corners in one cutting insert is increased (for example, a specification with two corners on one side is employed) while the size of the screw to be used when attaching the cutting insert to the body of the cutting tool is kept the same, then the insert width is large, and there is a problem in that it is difficult to increase the number of blades while the cutting insert is mounted on the body.

Therefore, the present invention aims to provide a cutting insert with a structure that can improve accuracy in attaching the cutting insert to the body of a cutting tool, and increase the number of blades while the cutting insert is mounted on the body, and an indexable rotary cutting tool and the body of the same.

One aspect of the present invention is a cutting insert including:
  an upper surface that has a shape with a lengthwise direction and a widthwise direction;
  a lower surface that is located opposite to the upper surface and has a shape with a lengthwise direction and a widthwise direction;
  a peripheral side surface that is formed so as to connect the upper surface and the lower surface;
  cutting edges that are respectively formed on an intersecting ridge line of the upper surface and the peripheral side surface, and on an intersecting ridge line of the lower surface and the peripheral side surface, and each have a curved ridge line that extends in a lengthwise direction thereof; and
  a through hole that penetrates from the upper surface to the lower surface,
  wherein end surfaces located in the lengthwise direction of the upper surface and the lower surface, of the peripheral surface, are respectively inclined with respect to the upper surface and the lower surface, and are parallel to each other, and
  a reference surface that is located opposite to the cutting edges, of the peripheral surface, is a flat surface that is orthogonal to the upper surface and the lower surface.

According to the above-described aspect, the reference surface that is located opposite to the cutting edges, of the peripheral surface, is a flat surface that is orthogonal to the upper surface and the lower surface. Therefore, it is possible to more stably attach the insert compared to inserts with the conventional shape. Also, it is possible to increase the rigidity of the insert clamp during cutting compared to the conventional insert shape by forming the end faces located in the lengthwise direction of the upper surface and the lower surface so as to be parallel to each other and so as to be inclined with respect to the upper surface and the lower surface. In addition, by employing the specification in which cutting edges are respectively provided on two surfaces (the upper surface and the lower surface), it is possible to increase the number of corners in one cutting insert without increasing the insert width, and therefore it is possible to increase the number of blades in the state where the cutting insert is mounted on the body.

In the cutting insert according to the above-described aspect, the curved cutting edges, and intersection regions that are respectively located in the lengthwise direction of the upper surface and the lower surface, may be connected to each other via curved portions when viewed in a direction that is orthogonal to the upper surface and a direction that is orthogonal to the lower surface, respectively.

In the cutting insert according to the above-described aspect, each of the curved portions may have an arc shape.

In the cutting insert according to the above-described aspect, a radius of curvature of the curved portions may be smaller than a radius of curvature of the cutting edges.

In the cutting insert according to the above-described aspect, the upper surface and the lower surface may have an axially symmetric shape centered around a central axis of symmetry that is orthogonal to the reference surface, and offset from each other in the lengthwise direction at the same angle as an inclination angle of the end surfaces.

In the cutting insert according to the above-described aspect, flanks of the cutting edges may have a shape in which a clearance angle thereof gradually changes from a positive angle to a negative angle in the lengthwise direction.

In the cutting insert according to the above-described aspect, the upper surface may be formed so as to have a shape in which a height of the upper surface in an axial direction that is orthogonal to the lengthwise direction and the widthwise direction decreases in a direction toward the cutting edge, and thereafter gradually increases in the direction toward the cutting edge.

In the cutting insert according to the above-described aspect, a height of the cutting edge in the axial direction may be larger than a height of a flat portion around the through hole, of the upper surface.

Another aspect of the present invention is a body of a cutting tool to which the cutting insert described above can be detachably attached, the body including:
  a seating surface on which a flat portion around the through hole of the upper surface or the lower surface of the cutting insert is to be seated as an attachment surface; and
  a binding surface that is orthogonal to the seating surface and is to abut against the reference surface of the cutting insert.

Another aspect of the present invention is an indexable rotary cutting tool including the above-described body.

DETAILED DESCRIPTION

Figure 1A:
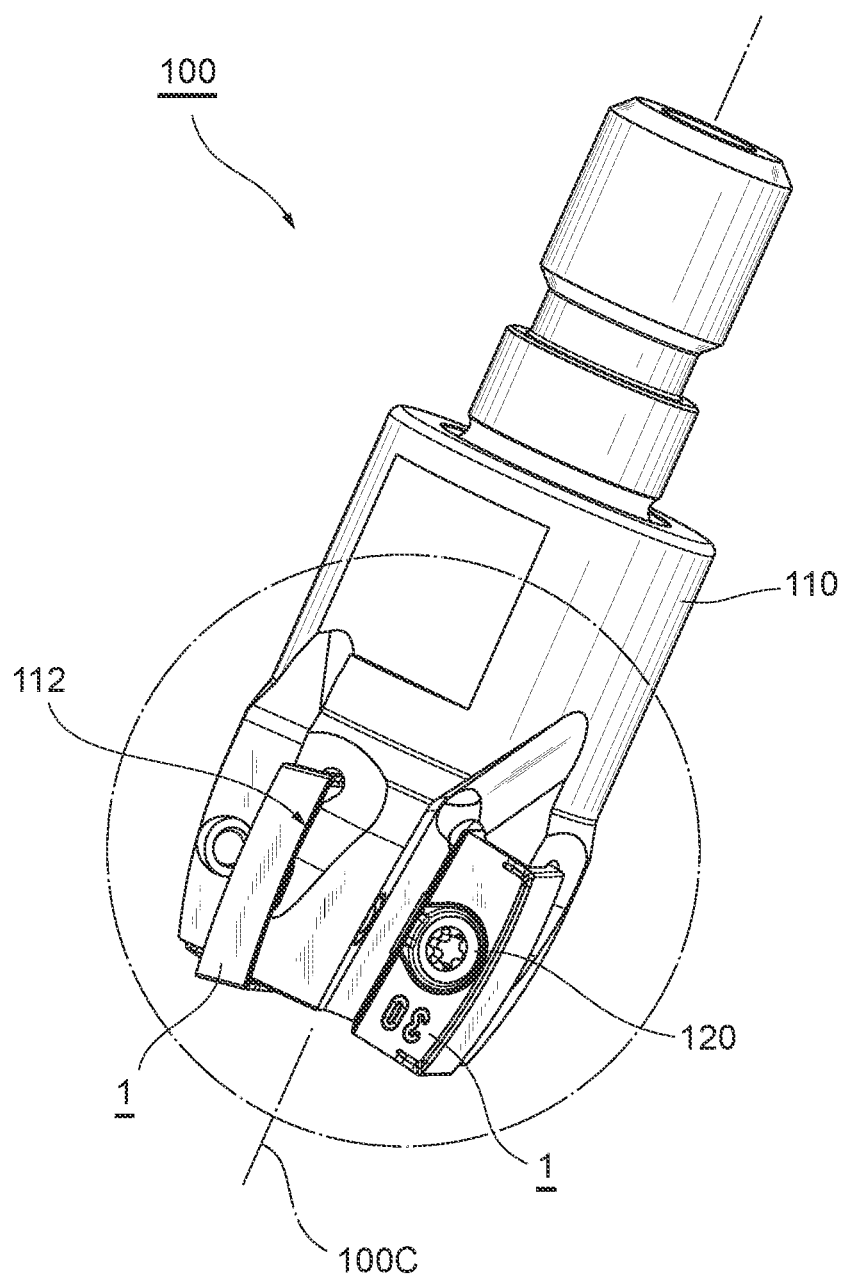
FIG. 1A is a diagram showing an example of an indexable rotary cutting tool to which a cutting insert is detachably attached.
Figure 1B:
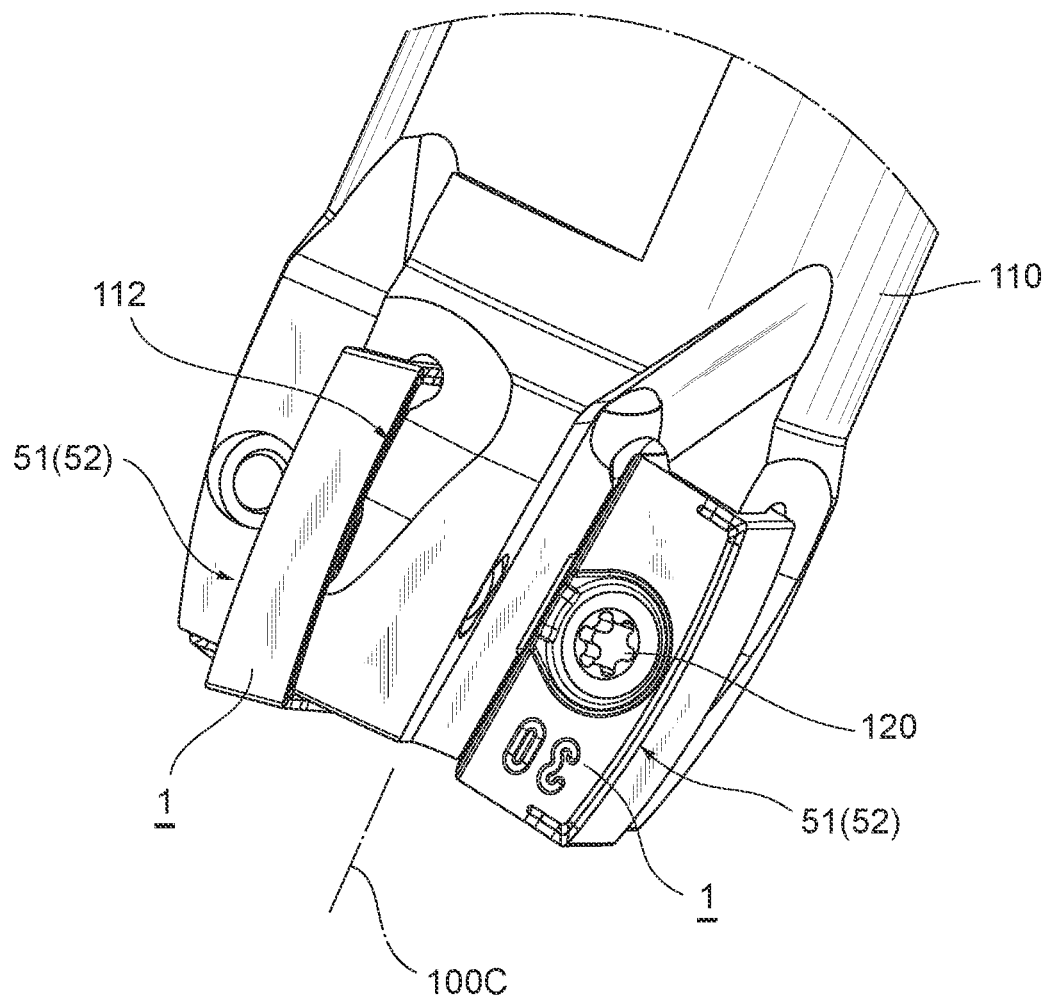
FIG. 1B is an enlarged diagram of a portion of the indexable rotary cutting tool shown in FIG. 1A.
Figure 2A:
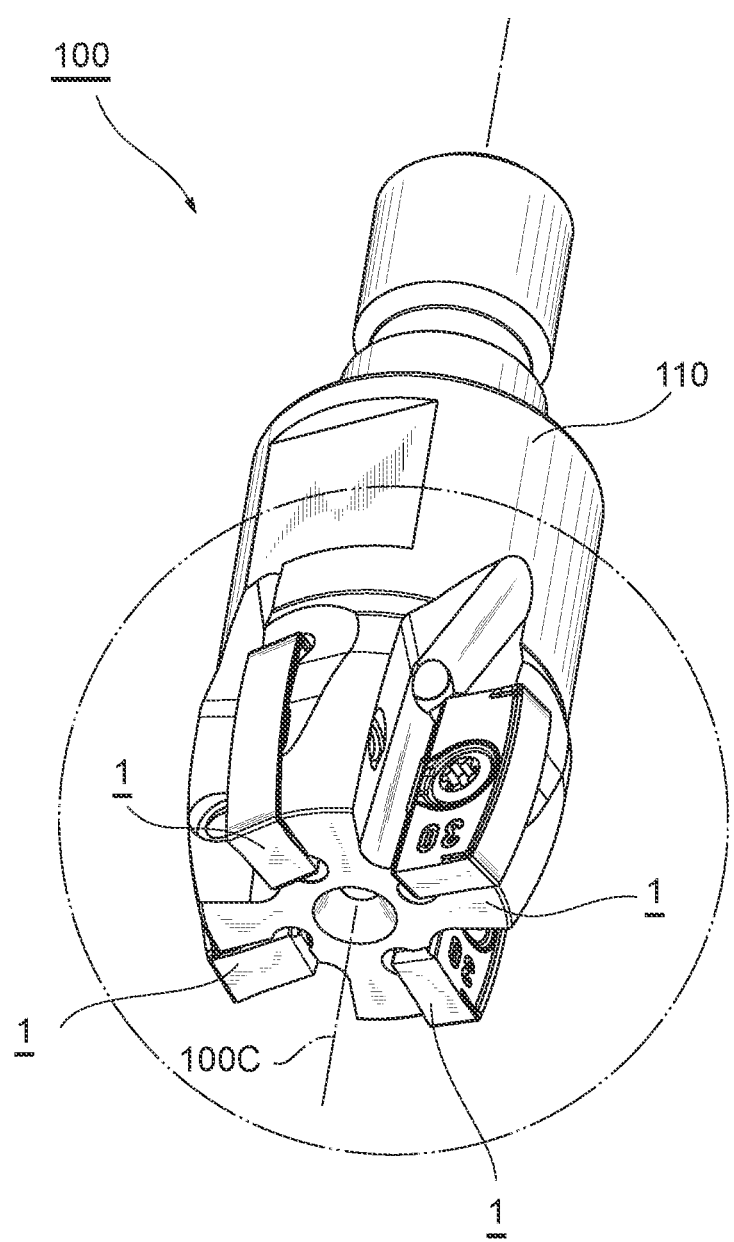
FIG. 2A is a perspective view from the blade tip side, showing an example of an indexable rotary cutting tool to which the cutting insert is detachably attached.
Figure 2B:
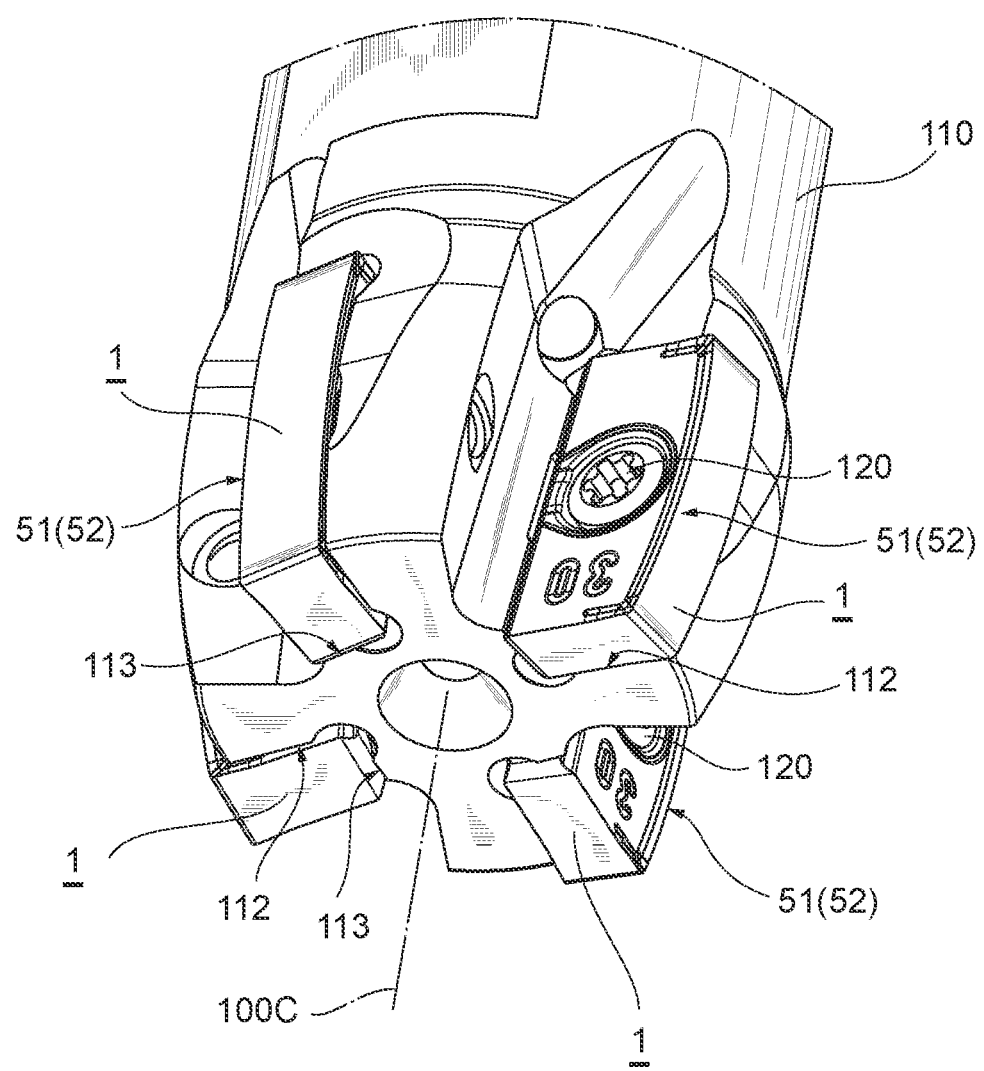
FIG. 2B is an enlarged diagram of a portion of the indexable rotary cutting tool shown in FIG. 2A.
Figure 3A:
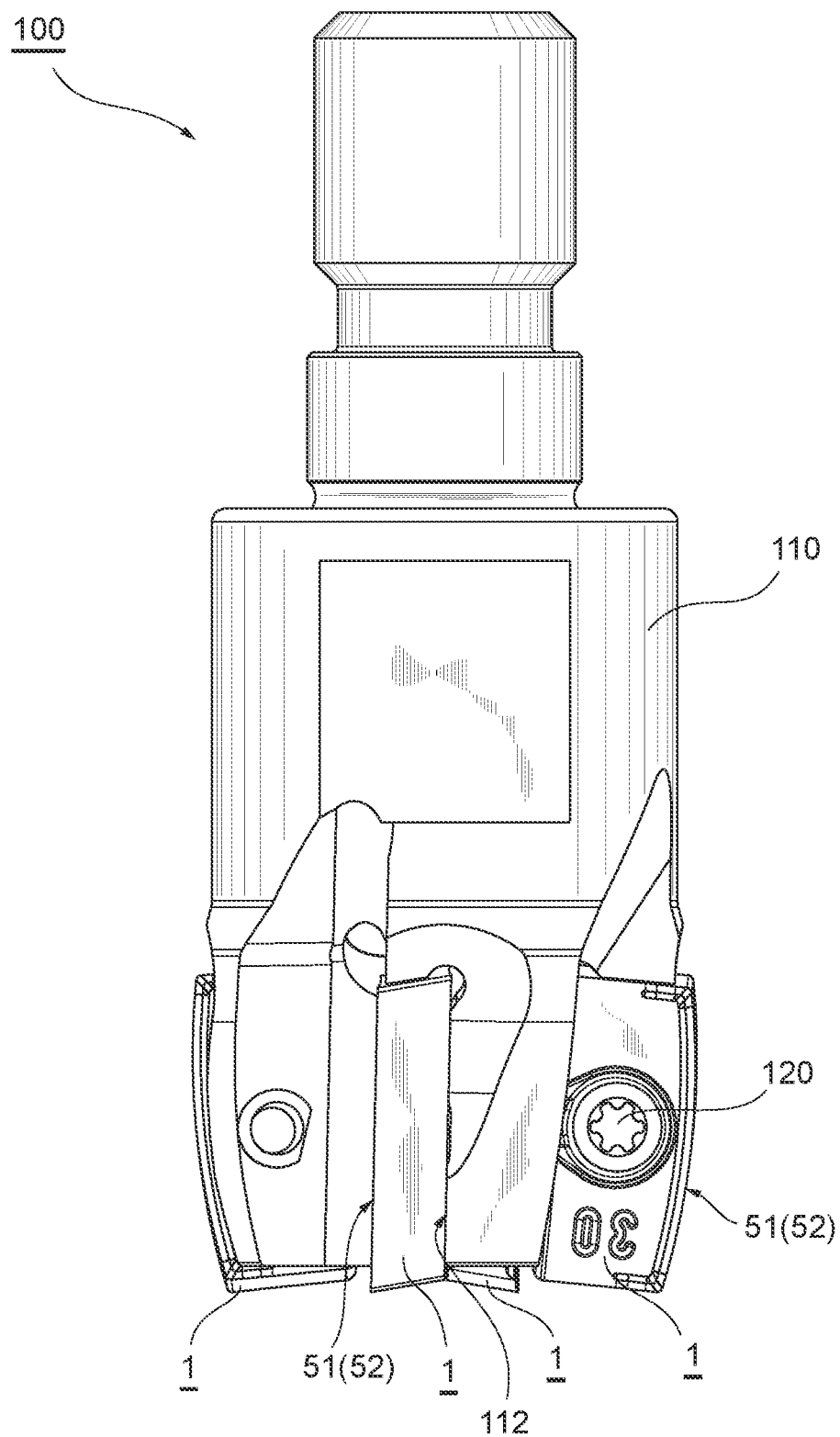
FIG. 3A is a side view showing an example of an indexable rotary cutting tool to which the cutting insert is detachably attached.
Figure 3B:
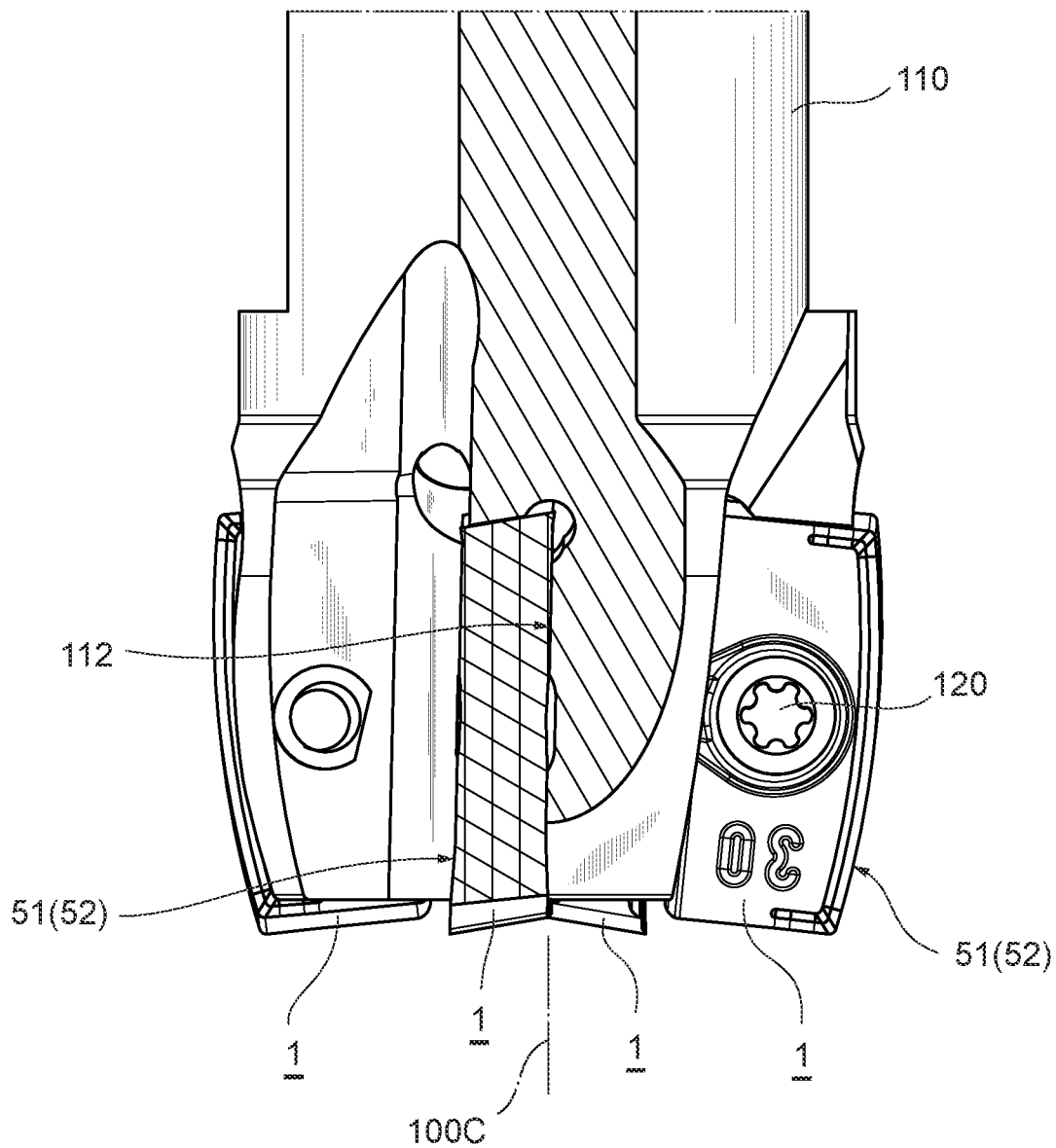
FIG. 3B is a vertical cross-sectional view showing a portion of the indexable rotary cutting tool shown in FIG. 3A.

Hereinafter, a preferred embodiment of a cutting insert according to the present invention will be described in detail with reference to the drawings. In the following, first, an overview of a cutting insert 1 that is used to cut a workpiece (not shown) will be described, and thereafter a characteristic portion of the cutting insert 1 according to the present invention will be described (see FIG. 1A and so on).

Overview of Indexable Rotary Cutting Tool

Figure 4:
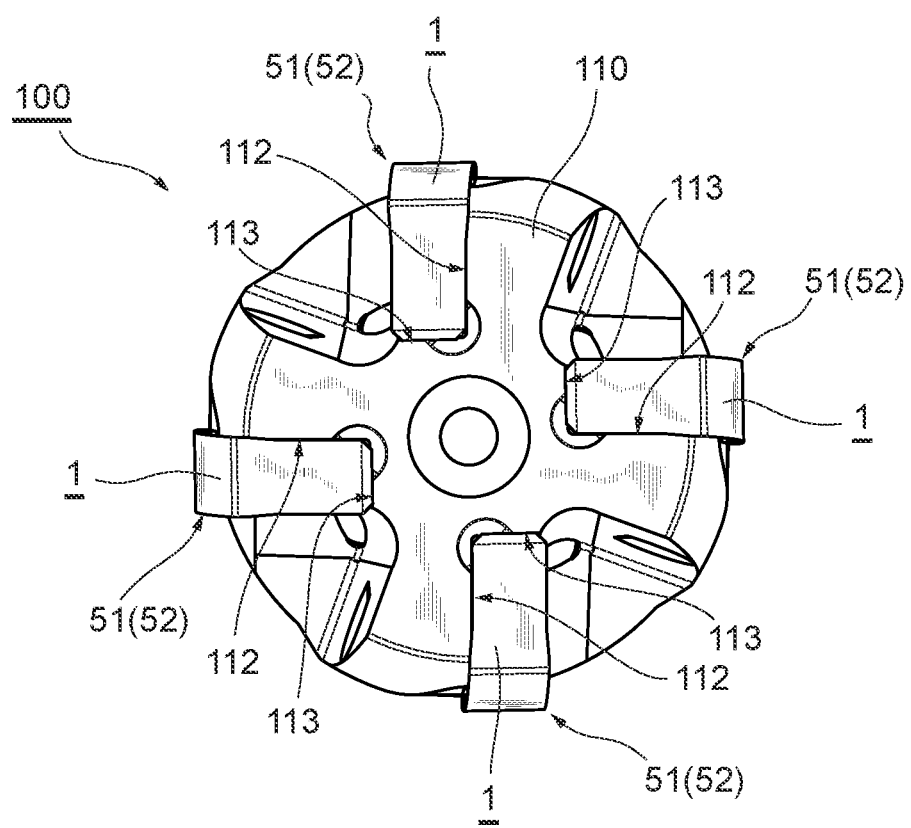
FIG. 4 is a view from the leading end (a bottom view), showing an example of an indexable rotary cutting tool to which the cutting insert is detachably attached.

An indexable rotary cutting tool 100 is a tool that is used when five-axis machining is to be performed on a work material (a workpiece) or the like such as a part, a die, or the like with a particularly complicated shape, in order to realize high-efficiency machining and ensure a good machined surface in the finishing process. In the present embodiment, an indexable rotary cutting tool 100 to/from which a cutting insert 1 with curved cutting edges 51 and 52 is attachable/detachable is used (see FIGS. 1A to 4). Such an indexable rotary cutting tool 100 rotates about a tool rotation axis 100C with the cutting insert 1 attached to a seating surface 112 provided at a leading end of a body 110, to cut a workpiece (see FIG. 4 and so on).

Overview of Cutting Insert

Figure 5:
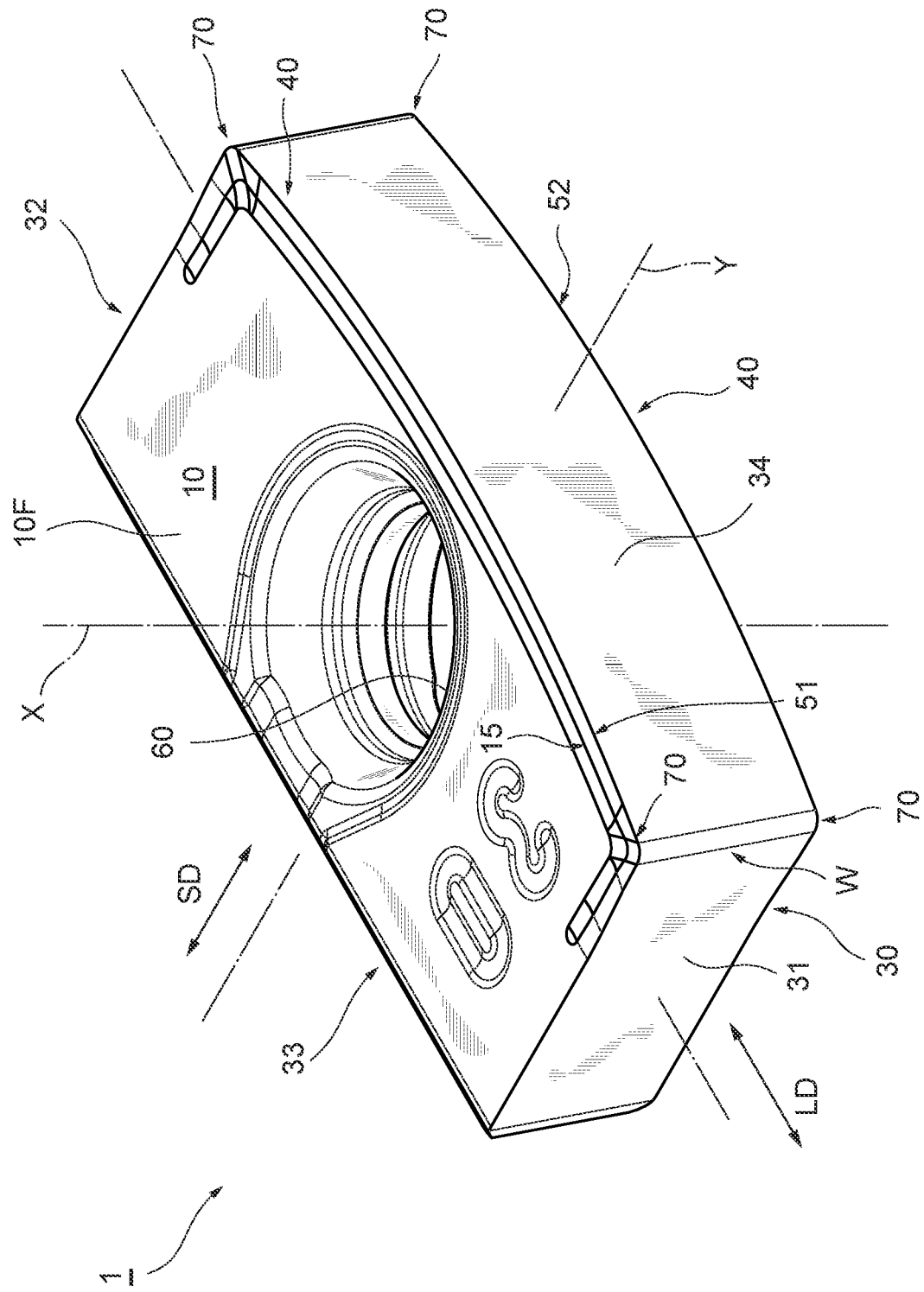
FIG. 5 is a perspective view showing an example of a cutting insert.

The cutting insert 1 according to the present embodiment has an upper surface 10 that is a first end surface facing upward in FIG. 5 along a central axis X, a lower surface 20 that is a second end surface facing downward opposite to the upper surface 10, a peripheral side surface 30 that is formed to connect the upper surface 10 and the lower surface 20 with each other, the cutting edges 51 and 52, a through hole 60 for a screw that penetrates through the cutting insert 1 from the upper surface 10 to the lower surface 20, corner portions (curved portions) 70, and so on (see FIG. 5 and so on).

The upper surface 10 and the lower surface 20 are substantially rectangular surfaces that each have a long side extending in a lengthwise direction (indicated by the reference sign LD in the drawings) and a short side extending in a widthwise direction (indicated by the reference sign SD in the drawings). The lower surface 20 includes a flat portion 20F that serves as an attachment surface or a binding surface that is in contact with the seating surface 112 of the body 110 when the cutting insert 1 is attached to the indexable rotary cutting tool 100. The upper surface 10 includes a flat portion 10F that serves as an attachment surface or a binding surface that is in contact with the seating surface of the body 110 when the cutting insert 1 is inverted and attached to the indexable rotary cutting tool 100.

Figure 6:
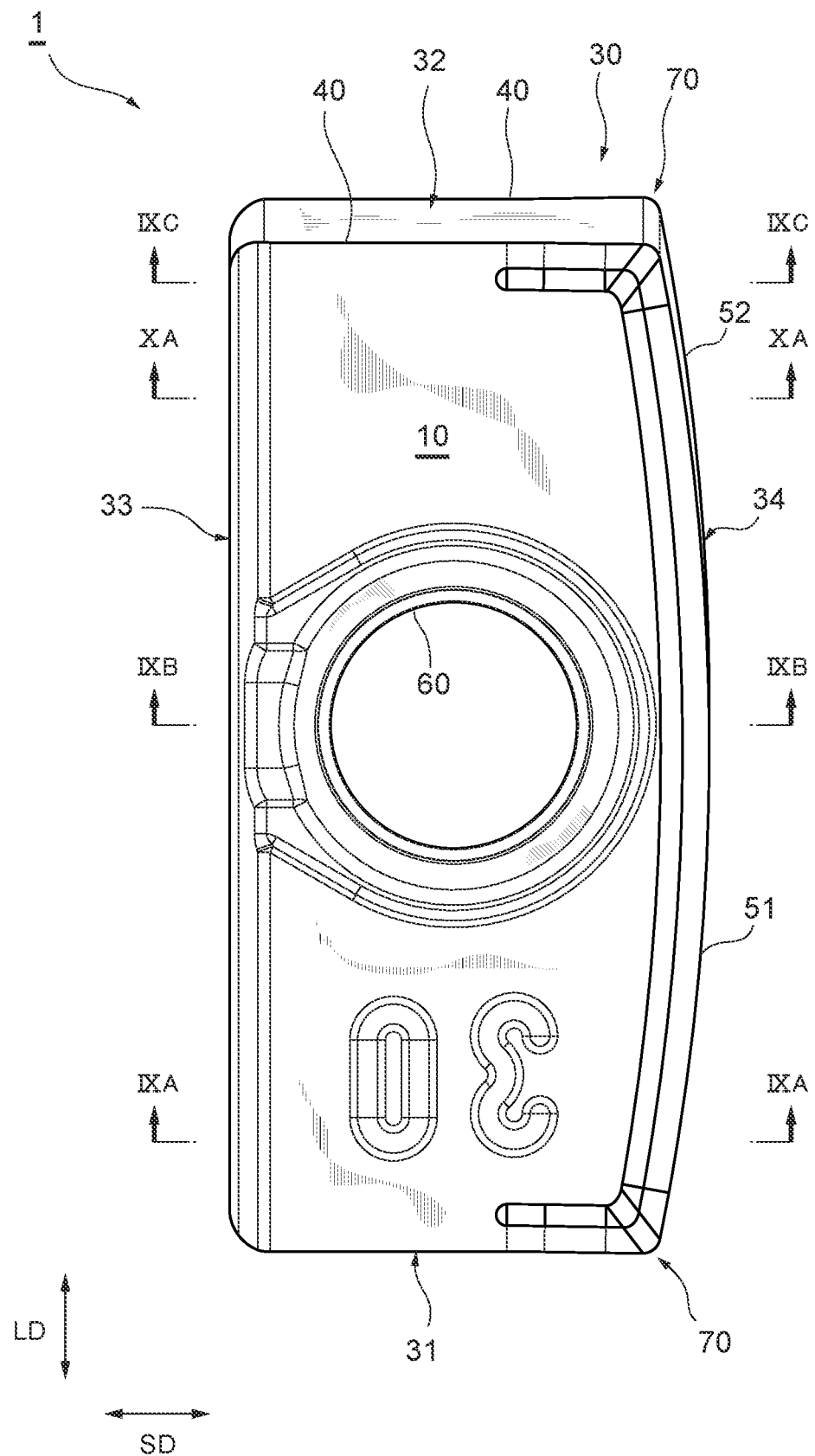
FIG. 6 is a view (a plan view) of the cutting insert viewed from an upper surface thereof.
Figure 8:
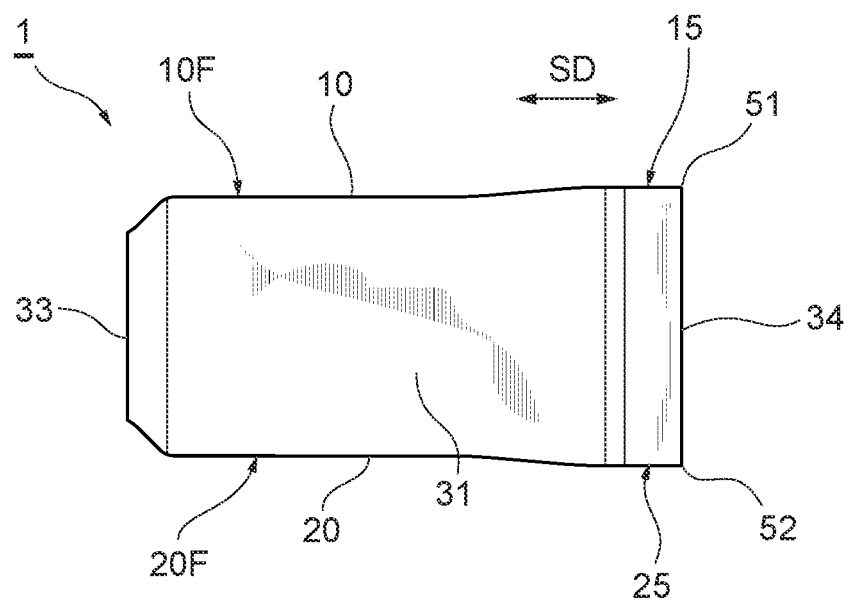
FIG. 8 is diagram showing a surface that is referred to as an end surface of the peripheral side surface on which the cutting edge of the cutting insert is provided, viewed in a lengthwise direction of the upper surface (or the lower surface)

The cutting edge 51 is formed on the intersecting ridge line of the upper surface 10 and the peripheral side surface 30, and the cutting edge 52 is formed on the intersecting ridge line of the lower surface 20 and the peripheral side surface 30 so that the ridge lines extending in the lengthwise direction are curved (see FIGS. 5 and 8, and so on). In the present embodiment, the cutting edges 51 and 52 are each formed in an arc shape (see FIG. 6 and so on). Note that corner portions 70 are not included in the cutting edges 51 and 52 formed in a curved or arc shape in such a way, and the cutting edges 51 and 52 and the corner portions 70 are distinguished from each other.

Figure 10A:
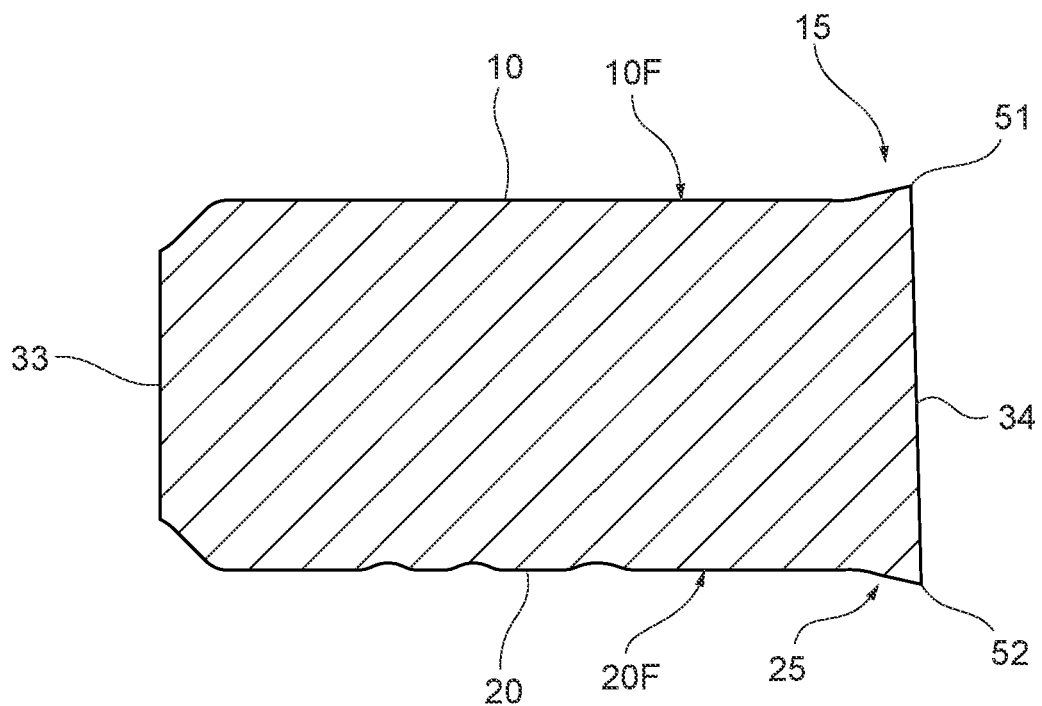
FIG. 10A is a cross-sectional view of the cutting insert taken along the XA-XA line in FIG. 6.
Figure 10B:
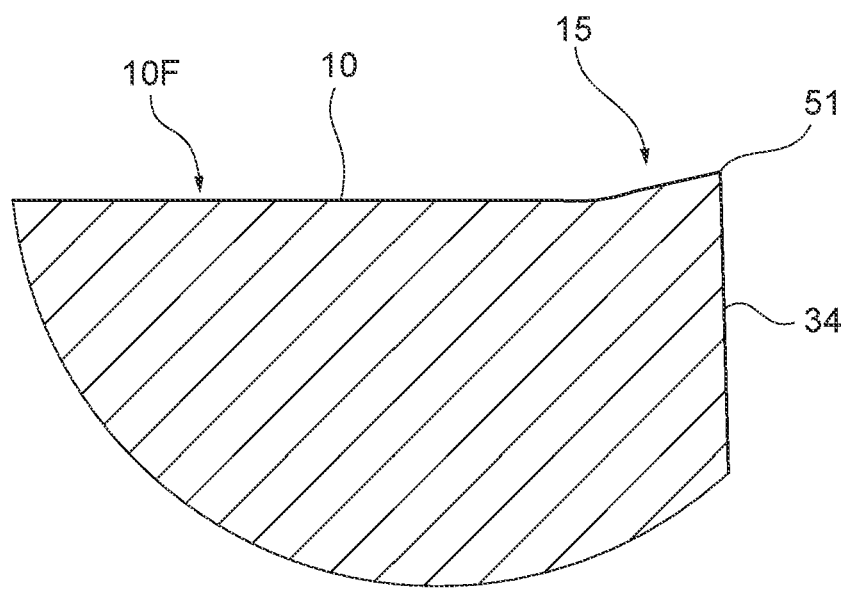
FIG. 10B is an enlarged view of a portion of the cutting edge of the cutting insert shown in FIG. 10A.

Portions of the upper surface 10 and the lower surface 20 that are continuous with the above-described cutting edges 51 and 52 are provided with rake portions 15 and 25 (see FIG. 10A and so on). In the cutting insert 1 according to the present embodiment, the rake portion 15 of the upper surface 10 is formed so that the height thereof in a direction along the axis that is orthogonal to the lengthwise direction LD and the widthwise direction SD (i.e., the central axis X) slightly decreases in a direction toward the cutting edge 51, and thereafter gradually increases in the direction toward the cutting edge 51, and, in the vicinity of the cutting edge 51, the rake portion 15 is higher than a flat portion 10F around the screw hole of the upper surface 10 (in other words, a flat portion 10F that serves as an attachment surface or a binding surface that is to be in contact with the seating surface of the body 110) (see FIG. 10B). The rake portion 25 of the lower surface 20 is formed so as to have the same configuration (see FIG. 10A and so on). By forming the portions of the upper surface 10 and the lower surface 20 continuous with the cutting edges 51 and 52 into such a shape, it is possible to increase the rake angle of the cutting insert 1 in the positive direction, and therefore the cutting resistance is reduced and the sharpness is improved.

The corner portions 70 are formed between the cutting edges 51 and 52 and intersection regions located in the lengthwise direction LD of the upper surface 10 or the lower surface 20 (in other words, ridge portions between the upper surface 10 or the lower surface 20 and the end surfaces 31 and 32) so as to connect them with each other (see FIG. 5 and so on). These corner portions 70 have a rounded shape (arc shape) when viewed in a direction that is orthogonal to the upper surface 10 or the lower surface 20 (see FIG. 6 and so on). The radius of curvature of the corner portions 70 in the rounded shape is smaller than the radius of curvature of the cutting edges 51 and 52.

Figure 7:
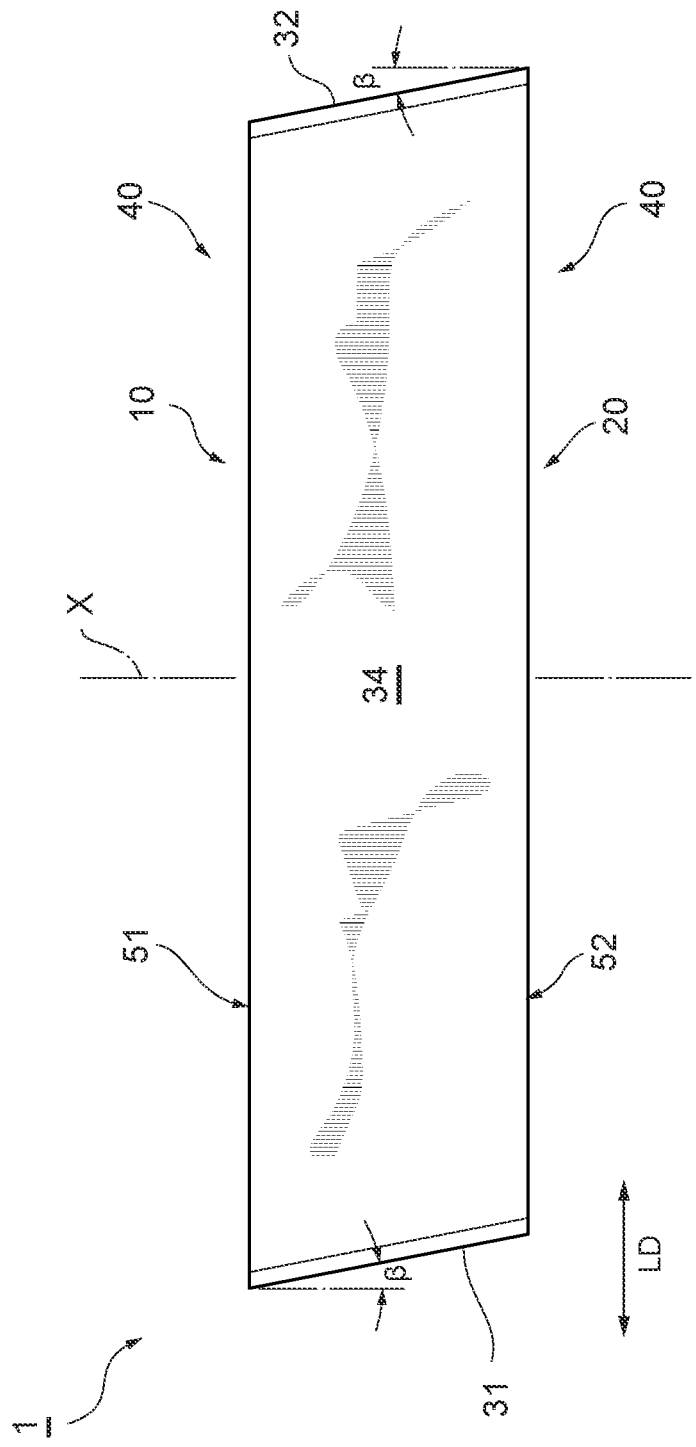
FIG. 7 is diagram showing a peripheral side surface on which a cutting edge of the cutting insert is provided, viewed in a widthwise direction of the upper surface (or the lower surface)

The two end surfaces in the aforementioned lengthwise direction LD of the peripheral side surface 30 (in other words, the two side surfaces that are continuous with the short sides of the upper surface 10 and the lower surface 20, where one end surface is indicated by the reference sign 31 and the other end surface is indicated by the reference sign 32) are inclined with respect to the upper surface or the lower surface, and are parallel to each other (see FIG. 5 and so on), and when the cutting insert 1 is viewed in the widthwise direction SD, the cutting insert 1 has a substantially oblique (diamond) shape (see FIG. 7). In the cutting insert 1 according to the present embodiment, these two end faces 31 and 32 are inclined at a negative angle β with respect to the upper surface 10 or the lower surface 20. The negative angle β mentioned here means, for example, an angle with which the angle of the end surface located on the base end side (which is the opposite side to the leading end and is the upper side in FIG. 3B and so on) of the indexable rotary cutting tool 100 (in this example, the angle between the end surface 32 that faces toward the base end side and the lower surface 20) is an acute angle when the cutting insert 1 is attached to the indexable rotary cutting tool 100 with a screw 120 such that the lower surface 20 faces toward the seating surface 112 (see FIGS. 3B and 7, and so on). This inclination angle β is, for example, 11 degrees. Generally, a cutting insert whose upper surface 10 and lower surface 20 are substantially rectangular is likely to move with respect to the body 110 due to the cutting resistance generated during machining. However, in this embodiment, the two end faces 31 and 32 are provided with inclinations as described above so as to realize a dovetail structure that strengthens the binding with the body 110 on the base end side of the indexable rotary cutting tool 100, in combination with the effect of the wedge shape, and prevents the insert from being lifted. As a result, the cutting insert 1 is less likely to move during machining, which realizes machining with a higher degree of precision. Also, the inclined end surface 31 (32) creates a positive clearance angle on the leading end side of the indexable rotary cutting tool 100.

The surface of the peripheral side surfaces 30 on the opposite side to the cutting edges 51 and 52 is configured as a reference surface 33 constituted by a flat surface that is perpendicular to the upper surface 10 and the lower surface 20 (see FIGS. 8 and 10A, and so on). The cutting insert 1 according to the present embodiment in which the reference surface 33 is orthogonal to the upper surface 10 and the lower surface 20 that serve as binding surfaces is less likely to be displaced when attached to the body 110. More specifically, for example, even if there is a difference in the attachment height of the cutting insert 1 due to the shape of the upper surface 10 or the lower surface 20 or a manufacturing error that may occur in the smooth surface, if the reference surface 33 is orthogonal, the positions of the cutting edges 51 and 52 (the distances from the binding surface 113 of the body 110, which is in contact with the reference surface 33, to the cutting edges 51 and 52) are always invariable despite the difference in the attachment height, and it is expected that the displacement is as small as possible (see FIG. 4 and so on). From this reason, for example, when the cutting insert 1 is inverted and reattached to the body 110 and the cutting edges 51 and 52 are replaced with each other, the difference in the distance from the cutting edges 51 and 52 to the side surface (the binding surface) is smaller, which makes it possible to perform more precise machining. Although the reference surface 33 that is constituted by a flat surface is described herein, such a reference surface 33 is merely a preferable example. As long as the surface can function as a reference surface as described above, there is no problem even if a groove is formed in a portion of the reference surface 33 and the reference surface 33 is not entirely flat, for example.

Figure 9A:
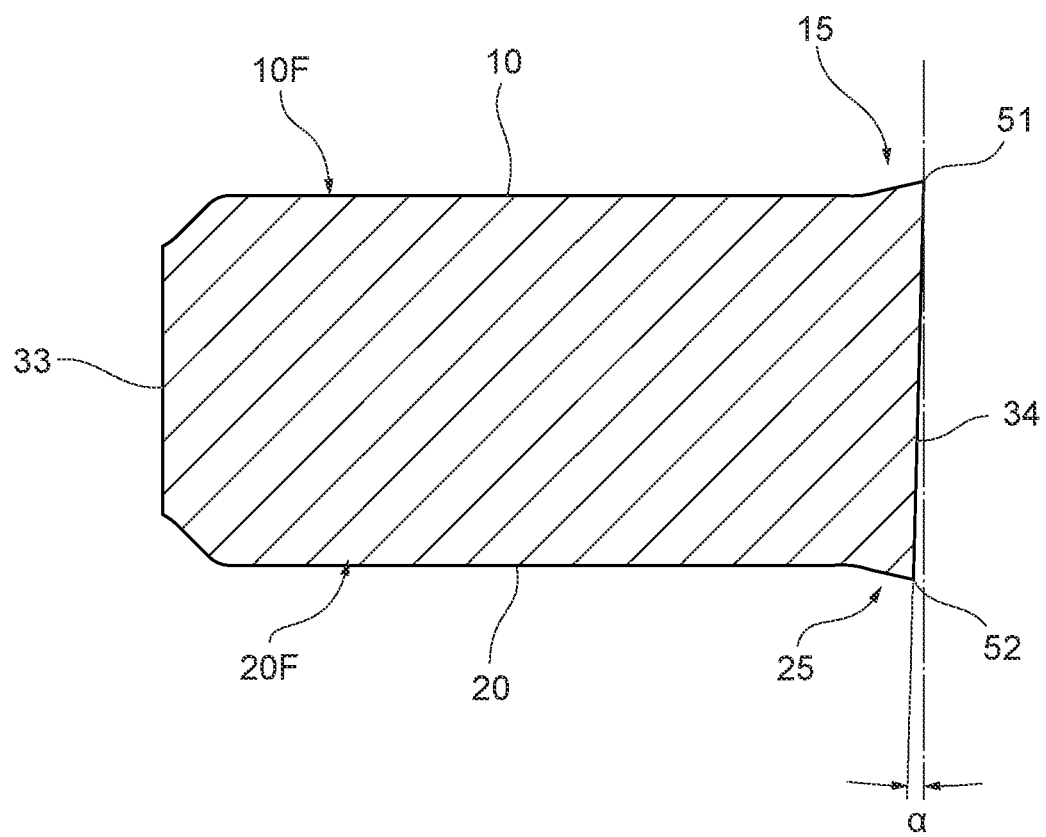
FIG. 9A is a cross-sectional view of the cutting insert taken along the IXA-IXA line in FIG. 6.
Figure 9B:
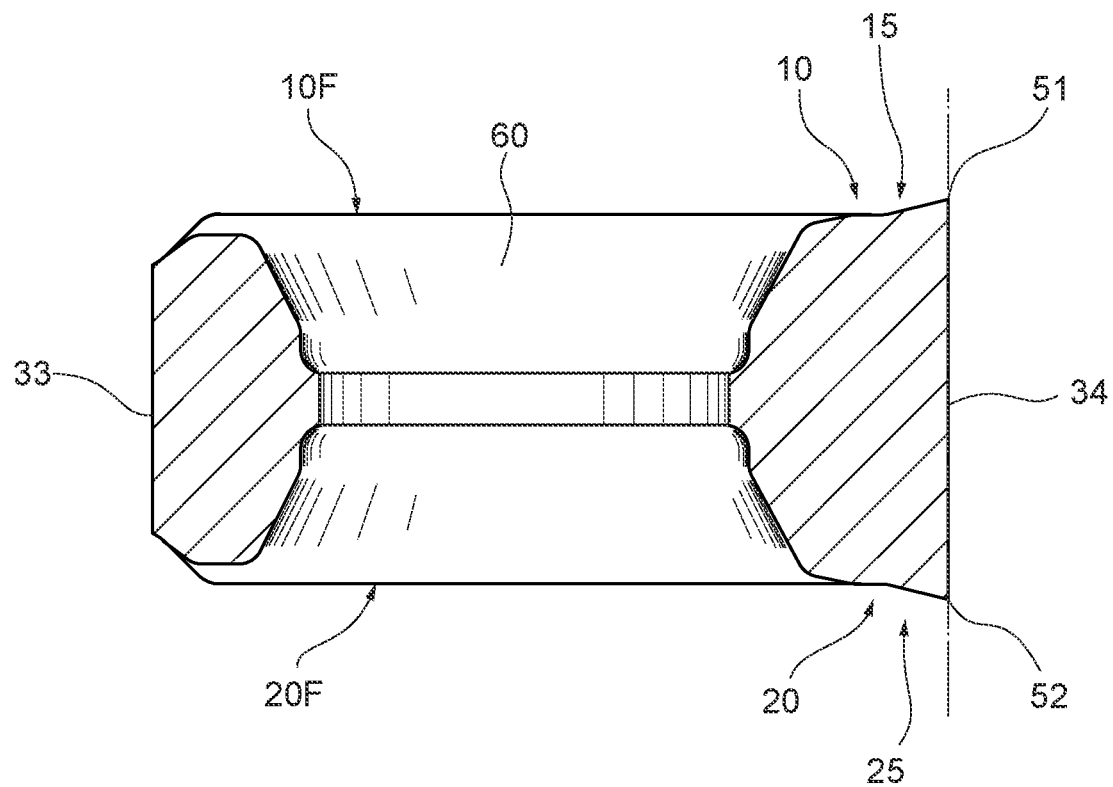
FIG. 9B is a cross-sectional view of the cutting insert taken along the IXB-IXB line in FIG. 6.
Figure 9C:
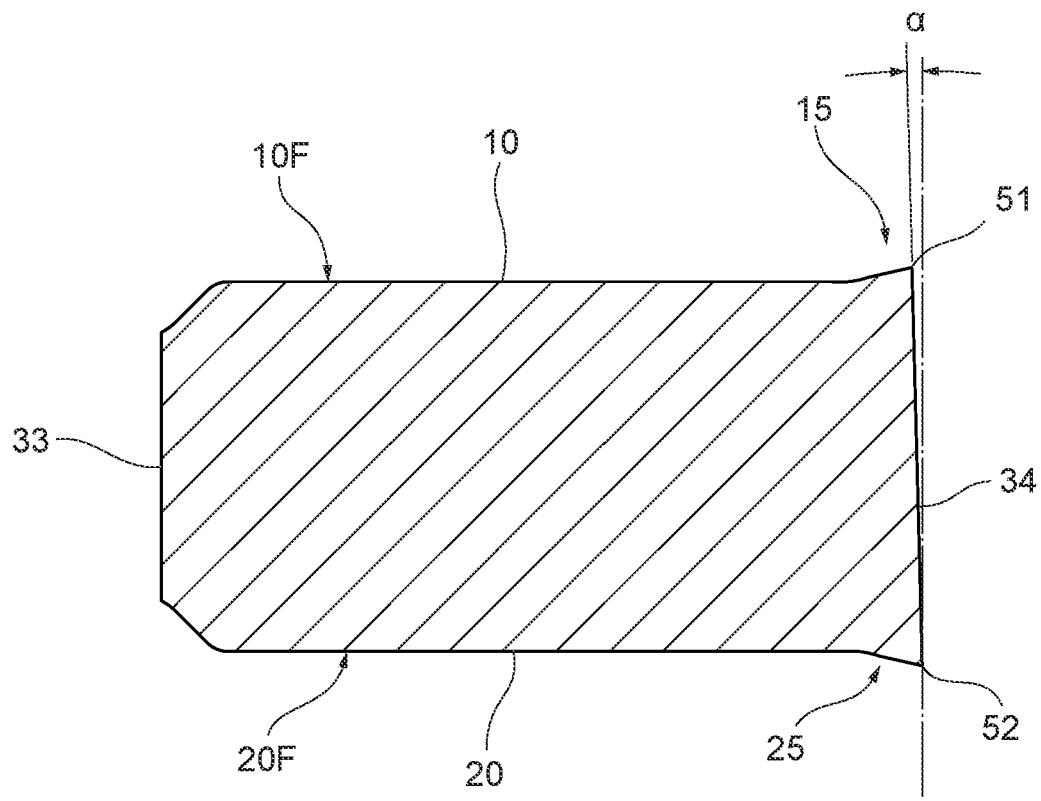
FIG. 9C is a cross-sectional view of the cutting insert taken along the IXC-IXC line in FIG. 6.
Figure 11:
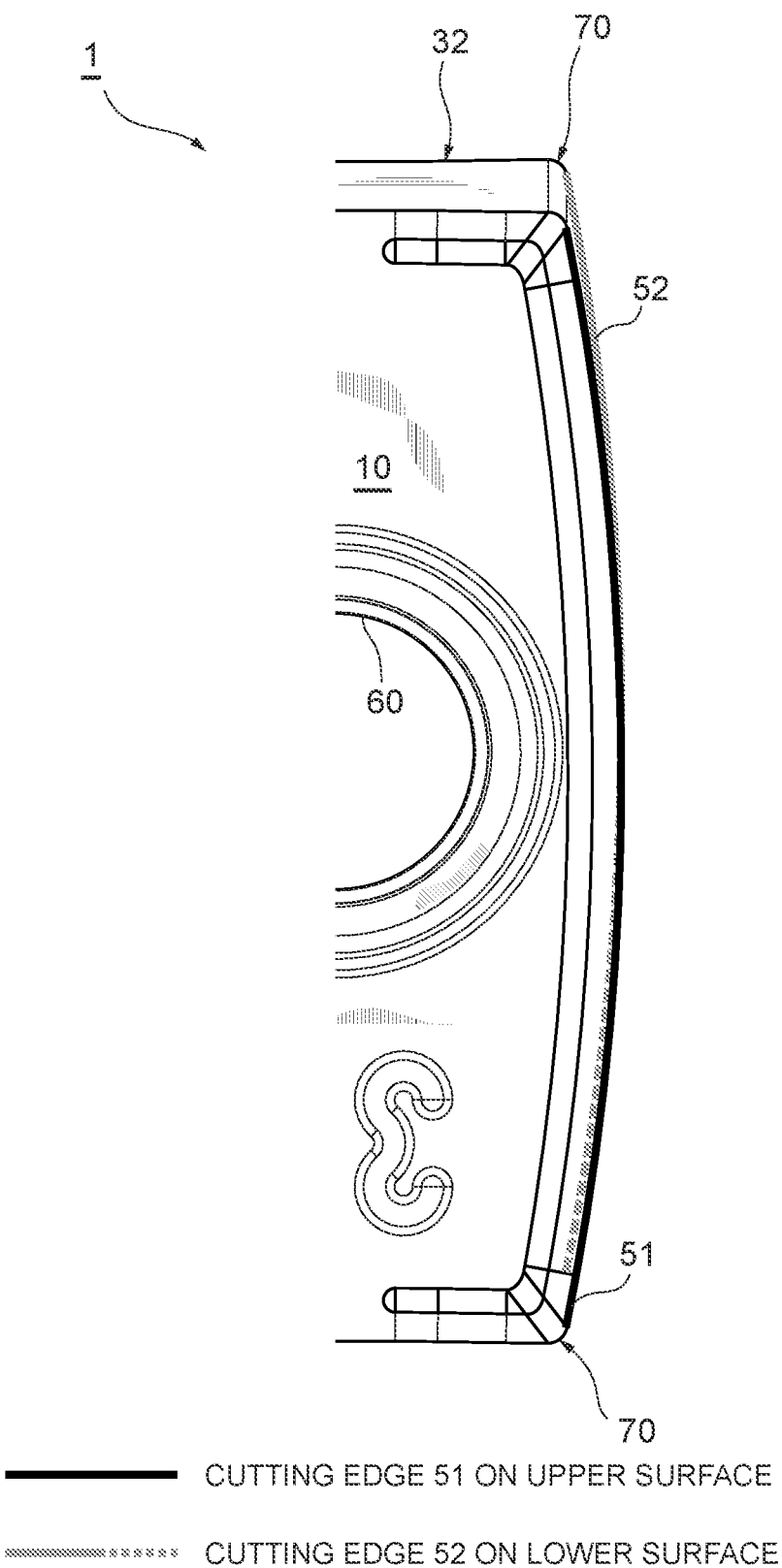
FIG. 11 is an enlarged view showing a difference between the position of the cutting edge of the upper surface and the position of the cutting edge of the lower surface of the cutting insert.

The portion of the peripheral side surface 30 continuous with the region between the cutting edge 51 on the upper surface 10 side and the cutting edge 52 on the lower surface 20 side functions as a flank (indicated by the reference sign 34) for the cutting edges 51 and 52 (see FIG. 5 and so on). The flank 34 of the cutting insert 1 according to the present embodiment is formed so that the clearance angle α thereof gradually changes in the lengthwise direction LD (see FIGS. 6 and 9A to 9C). That is to say, the cutting insert 1 according to the present embodiment is configured so that the upper surface 10 and the lower surface 20 have an axisymmetric shape centered around a central axis of symmetry (indicated by the reference sign Y) that is orthogonal to the reference surface 33 and passes through the center of the reference surface 33, and the cutting edge 51 on the upper surface 10 side and the cutting edge 52 on the lower surface 20 side can be interchanged by reversing the cutting insert 1 by 180° about the center axis Y of symmetry. In addition, the upper surface 10 and the lower surface 20 are offset from each other in the lengthwise direction LD at the same angle as the inclination angle β of the end surfaces 31 and 32 (FIGS. 7 and 11). The flank 34 constituted by a surface connecting the upper surface 10 and the lower surface 20 that are in such a positional relationship has a shape in which the clearance angle α gradually changes from a positive angle to a negative angle in the lengthwise direction LD (see FIGS. 9A to 9C). In addition, the clearance angle α of the flank 34 is zero at an intermediate position in the lengthwise direction LD (see FIG. 9B). Such a flank 34 of the cutting insert 1 according to the present embodiment may be, for example, a surface that is formed by the locus through which the arc-shaped cutting edge 51 passes when the arc-shaped cutting edge 51 of the upper surface 10 is translated to (the position of) the arc-shaped cutting edge 52 of the lower surface 20. In other words, the flank 34 may be constituted by a curved surface obtained by extending the curve of the arc-shaped cutting edge 51 of the upper surface 10 toward the arc-shaped cutting edge 52 of the lower surface 20.

As described so far, the above cutting insert 1 according to the present embodiment has a structure that has the cutting edges 51 and 52 respectively on the upper surface 10 and the lower surface 20. Therefore, it is possible to provide a plurality of blades without the need to increase the insert width (i.e., in light of the above embodiment, the length in the widthwise direction SD, which is, in other words, the distance between the cutting edges 51 and 52 and the reference surface 33). In this way, by reducing the insert width while providing a sufficient number of blades, it is possible to increase the number of inserts mounted on the body 110 of the indexable rotary cutting tool 100 and increase the number of cutting edges of the tool.

Also, as described above, despite being of a two-corner type, the cutting insert 1 according to the present embodiment has a flat surface on the opposite side to the cutting edges 51 and 52 in the widthwise direction SD, and this flat surface effectively functions as the reference surface 33 when the insert is manufactured as well as when the cutting insert 1 is attached to the cutter body. Therefore, it is possible to realize unprecedented high-precision machining.

In addition, the cutting insert 1 according to the present embodiment described above and the indexable rotary cutting tool 100 to which the cutting insert 1 can be attached can solve the following problems of the conventional structure.

It is possible to solve the problem of the conventional structure in that the reference surface is inclined, the cutting edge have only one corner, and therefore accuracy and economy are poor. In other words, if the side surface on the opposite side to the cutting edge is a flat surface and is inclined at a positive angle, it is not easy to use the surface as a "reference surface" for accurately attaching the curved cutting edge (and the flank). Also, if the inclined surface is used as a reference surface, machining accuracy tends to be low. Also, only one cutting edge can be used, and therefore economic efficiency may be low.

It is possible to solve the problem of the conventional structure in that it is impossible to mount many inserts on the body due to the square shape thereof despite the reference surface being inclined and the cutting edge having four corners, and economy (machining efficiency) is poor. For example, in a four-corner type positive insert with an arc-shaped cutting edge, the side surface opposite to the cutting edge is not a flat surface. In addition, such an insert does not have a widthwise direction and has a square shape, and therefore the width of the insert is large, and it cannot be applied to an end mill with a small diameter.

Although the above-described embodiment is an example of a preferred embodiment of the present invention, the present invention is not limited to such an embodiment, and various modifications can be made without departing from the spirit of the present invention.

The present invention is desirably applicable to a cutting insert and an indexable rotary cutting tool.

What is claimed is:

1. A cutting insert comprising:
    an upper surface that has a shape with a lengthwise direction and a widthwise direction;
    a lower surface that is located opposite to the upper surface and has a shape with a lengthwise direction and a widthwise direction;
    a peripheral side surface that is formed so as to connect the upper surface and the lower surface;
    cutting edges that are respectively formed on an intersecting ridge line of the upper surface and the peripheral side surface, and on an intersecting ridge line of the lower surface and the peripheral side surface, and each have a curved ridge line that extends in a lengthwise direction thereof; and
    a through hole that penetrates from the upper surface to the lower surface,
    wherein end surfaces located in the lengthwise direction of the upper surface and the lower surface, of the peripheral surface, are respectively inclined with respect to the upper surface and the lower surface, and are parallel to each other,
    a reference surface that is located opposite to the cutting edges, of the peripheral surface, is a flat surface that is orthogonal to the upper surface and the lower surface,
    flanks of the cutting edges have a shape in which a clearance angle thereof gradually changes from a positive angle to a negative angle in the lengthwise direction, and
    the upper surface is formed so as to have a shape in which a height of the upper surface in an axial direction that is orthogonal to the lengthwise direction and the widthwise direction decreases in a direction toward the cutting edge, and thereafter gradually increases in the direction toward the cutting edge.

2. The cutting insert according to claim 1,
    wherein the curved cutting edges, and intersection regions that are respectively located in the lengthwise direction of the upper surface and the lower surface, are connected to each other via curved portions when viewed in a direction that is orthogonal to the upper surface and a direction orthogonal to the lower surface, respectively.

3. The cutting insert according to claim 2,
    wherein each of the curved portions has an arc shape.

4. The cutting insert according to claim 3,
    wherein a radius of curvature of the curved portions is smaller than a radius of curvature of the cutting edges.

5. The cutting insert according to claim 1,
    wherein the upper surface and the lower surface have an axially symmetric shape centered around a central axis of symmetry that is orthogonal to the reference surface, and are offset from each other in the lengthwise direction at the same angle as an inclination angle of the end surfaces.

6. The cutting insert according to claim 1,
    wherein a height of the cutting edge in the axial direction is larger than a height of a flat portion around the through hole, of the upper surface.

7. A body of a cutting tool to which the cutting insert according to claim 1 can be detachably attached, the body comprising:
    a seating surface on which a flat portion around the through hole of the upper surface or the lower surface of the cutting insert is to be seated as an attachment surface; and
    a binding surface that is orthogonal to the seating surface and is to abut against the reference surface of the cutting insert.

8. A rotary cutting tool comprising the body according to claim 7.

* * * * *